United States Patent
Enck et al.

(10) Patent No.: US 9,916,475 B2
(45) Date of Patent: Mar. 13, 2018

(54) PROGRAMMABLE INTERFACE FOR EXTENDING SECURITY OF APPLICATION-BASED OPERATING SYSTEM

(71) Applicants: North Carolina State University, Raleigh, NC (US); Technische Universitat Darmstadt, Darmstadt (DE)

(72) Inventors: William Harold Enck, Raleigh, NC (US); Adwait Pravin Nadkarni, Raleigh, NC (US); Ahmad-Reza Sadeghi, Darmstadt (DE); Stephan Heuser, Nuremberg (DE)

(73) Assignees: NORTH CAROLINA STATE UNIVERSITY, Raleigh, NC (US); TECHNISCHE UNIVERSITAT DARMSTADT, Darmstadt (DE)

( * ) Notice: Subject to any disclaimer, the term of this patent is extended or adjusted under 35 U.S.C. 154(b) by 125 days.

(21) Appl. No.: 14/823,262

(22) Filed: Aug. 11, 2015

(65) Prior Publication Data
US 2016/0042191 A1 Feb. 11, 2016

Related U.S. Application Data

(60) Provisional application No. 62/036,089, filed on Aug. 11, 2014.

(51) Int. Cl.
*G06F 21/62* (2013.01)
(52) U.S. Cl.
CPC ........ *G06F 21/629* (2013.01); *G06F 21/6218* (2013.01)

(58) Field of Classification Search
CPC .................................................. G06F 21/629
USPC .................................................. 726/1
See application file for complete search history.

(56) References Cited

U.S. PATENT DOCUMENTS

| | | | |
|---|---|---|---|
| 2009/0165081 A1* | 6/2009 | Zhang ............... | G06F 21/6218 726/1 |
| 2011/0138174 A1* | 6/2011 | Aciicmez ........... | G06F 21/6272 713/165 |

OTHER PUBLICATIONS

Backes et al., "Android Security Framework: Enabling Generic and Extensible Access Control on Android," Technischer Bericht Nr. A/01/2014, https://infsec.cs.uni-saarland.de/~bugiel/publications/pdfs/UdS-A-01- 2014.pdf, pp. 1-27 (2014).

(Continued)

*Primary Examiner* — Jacob Lipman
(74) *Attorney, Agent, or Firm* — Jenkins, Wilson, Taylor & Hunt, P.A.

(57) ABSTRACT

Methods, systems, and computer readable media for extending security of an application-based computer operating system are disclosed. One system includes a memory. The system also includes an application-based operating system security module bridge implemented using the memory. The application-based operating system security module bridge is for receiving, from a reference monitor, a registration for at least one security authorization hook, for receiving a callback when a protected event occurs, for communicating with the reference monitor that registered the at least one security authorization hook corresponding to the callback, and for receiving, from the reference monitor, an access control decision associated with the protected event.

21 Claims, 3 Drawing Sheets

(56) References Cited

OTHER PUBLICATIONS

Backes et al., "Android Security Framework: Extensible Multi-Layered Access Control on Android," Saarland University/CISPA, Germany, https://www.infsec.cs.uni-saarland.de/~bugiel/publications/pdfs/bugiel14-acsac1.pdf, pp. 1-10 (2014).
Heuser et al., "ASM: A Programmable Interface for Extending Android Security," Technical Report, Nr. TUD-CS-2014-0063, pp. 1-15 (Mar. 31, 2014).
Anderson, "Computer Security Technology Planning Study," ESD-TR-73-51, vol. II, Air Force Electronic Systems Division, Hanscom AFB, Bedford, MA (Oct. 1972).
"AppArmor," Wikipedia AppArmor Main Page http://wiki.apparmor.net/index.php/Main_Page (Accessed Jun. 30, 2016).
Backes et al., "AppGuard—Enforcing User Requirements on Android Apps," In Proceedings of TACAS 2013. Springer Berlin Heidelberg (2013).
Beresford et al., "MockDroid: Trading Privacy for Application Functionality on Smartphones," In Proceedings of HotMobile (2011).
Bugiel et al., "XManDroid: A New Android Evolution to Mitigate Privilege Escalation Attacks," Tech. Rep. TR-2011-04, Technische Universitat Darmstadt, Center for Advanced Security Research Darmstadt, Darmstadt, Germany (Apr. 2011).
Bugiel et al., "Practical and Lightweight Domain Isolation on Android," In Proceedings of the ACM Workshop on Security and Privacy in Mobile Devices (SPSM) (2011).
Bugiel et al., "Flexible and Fine-Grained Mandatory Access Control on Android for Diverse Security and Privacy Policies," In Proceedings of the 22nd USENIX Security Symposium, pp. 131-146 (2013).
Conti et al., "CRePE: Context-Related Policy Enforcement for Android," In Proceedings of ISC (2010).
Davis et al., "RetroSkeleton: Retrofitting Android Apps," In Proceedings of MobiSys (2013).
Dietz et al., "Quire: Lightweight Provenance for Smart Phone Operating Systems," In Proceedings of the USENIX Security Symposium (2011).
"AppLock," DoMobile Lab. https://play.google.com/store/apps/details?id=com.domobile.applock (Retrieved Jun. 30, 2016).
Enck et al., "TaintDroid: An Information-Flow Tracking System for Realtime Privacy Monitoring on Smartphones," In Proceedings of USENIX OSDI (2010).
Enck et al., "On Lightweight Mobile Phone Application Certification," In Proceedings of ACM CCS (2009).
Felt et al., "How to Ask for Permission," In Proceedings of the USENIX Workshop on Hot Topics in Security (HotSec) (2012).
Felt et al., "Android permissions: user attention, comprehension, and behavior," In Proceedings of Symposium on Usable Privacy and Security (SOUPS) (2012).
Felt et al., "Permission Re-Delegation: Attacks and Defenses," In Proceedings of the USENIX Security Symposium (Aug. 2011).
Hornyack et al., "These Aren't the Droids You're Looking for: Retrofitting Android to Protect Data from Imperious Applications," in Proceedings of ACM CCS (2011).
Jeon et al., "Dr. Android and Mr. Hide: Fine-grained Permissions in Android Applications," In Proceedings of the ACM Workshop on Security and Privacy in Mobile Devices (SPSM) (2012).
McDaniel et al., "Methods and limitations of security policy reconciliation," In Proceedings of IEEE S&P, IEEE Computer Society (2002).
Nadkarni et al., "Preventing Accidental Data Disclosure in Modern Operating Systems," In Proceedings of ACM CCS (2013).
Nauman et al., "Apex: Extending Android Permission Model and Enforcement with User-defined Runtime Constraints," In Proceedings of ASIACCS (2010).
Ongtang et al., "Semantically Rich Application-Centric Security in Android," In Proceedings of the Annual Computer Security Applications Conference (2009).
"Trepn Power Profiler," Qualcomm Technologies, Inc. Developer Network, https://developer.qualcomm.com/mobile-development/increase-app-performance/trepn-profiler (Retrieved Jun. 30, 2016).
Rao et al., "Dynamic Mandatory Access Control for Multiple Stakeholders," In Proceedings of ACM SACMAT (2009).
Schaufler, "LSM: Multiple concurrent LSMs," [PATCH v13 0/9], https://lwn.net/Articles/548314/ (Apr. 23, 2013).
"SELinux Project," Security-Enhanced Linux Wikipedia Main Page. http://selinuxproject.org/page/Main_Page Last Modified May 12, 2013 (Retrieved Jun. 30, 2016).
Smalley et al., "Security Enhanced (SE) Android: Bringing Flexible MAC to Android," In Proceedings of NDSS (2013).
Schaufler, "The Simplified Mandatory Access Control Kernel (SMACK)", White Paper, The Smack Project http://schaufler-ca.com/ (Retrieved Jun. 30, 2016).
TOMOYO Linux. http://tomoyo.sourceforge.jp (Retrieved Jun. 30, 2016).
Watson, "TrustedBSD: Adding Trusted Operating System Features to FreeBSD," In Proceedings of the USENIX Annual Technical Conference, FREENIX Track (2001).
Watson, "A Decade of OS Access-Control Extensibility," Communications of the ACM, vol. 56, No. 2, pp. 52-63 (Feb. 2013).
Wright et al., "Linux Security Modules: General Security Support for the Linux Kernel," In Proceedings of the USENIX Security Symposium (2002).
Xu et al., "Aurasium: Practical Policy Enforcement for Android Applications," In Proceedings of the USENIX Security Symposium (2012).
Yama Linux Security Module (LSM). https://www.kernel.org/doc/Documentation/security/Yama.txt (Retrieved Jun. 30, 2016).
Zhou et al., "Taming Information-Stealing Smartphone Applications (on Android)," In Proceedings of the International Conference on Trust and Trustworthy Computing (Jun. 2011).

\* cited by examiner

PROGRAMMABLE INTERFACE FOR EXTENDING SECURITY OF APPLICATION-BASED OPERATING SYSTEM

PRIORITY CLAIM

This application claims the priority benefit of U.S. Provisional Patent Application Ser. No. 62/036,089, filed Aug. 11, 2014; the disclosure of which is incorporated herein by reference in its entirety.

GOVERNMENT INTEREST

This invention was made with government support under Grant Nos. CNS-1253346 and CNS-1222680 awarded by the National Science Foundation. The government has certain rights in the invention.

TECHNICAL FIELD

The subject matter described herein relates to a programmable security interface for application-based operating systems, such as Android, with semantically rich APIs.

BACKGROUND

Android, iOS, and Windows are changing the application architecture of consumer operating systems. These new architectures required OS designers to rethink security and access control. While the new security architectures improve on traditional desktop and server OS designs, they lack sufficient protection semantics for different classes of OS customers (e.g., consumer, enterprise, and government). The Android OS in particular has seen over a dozen research proposals for security enhancements. Accordingly, there exists a need for an extensible security framework for Android and other application-based operating systems.

SUMMARY

Methods, systems, and computer readable media for extending security of an application-based computer operating system are disclosed. One system includes a memory. The system also includes an application-based operating system security module bridge implemented using the memory. The application-based operating system security module bridge is for receiving, from a reference monitor, a registration for at least one security authorization hook, for receiving a callback when a protected event occurs, for communicating with the reference monitor that registered the at least one security authorization hook corresponding to the callback, and for receiving, from the reference monitor, an access control decision associated with the protected event.

One method for extending security of an application-based computer operating system occurs at an application-based operating system security module bridge implemented using a memory. The method includes receiving, from a reference monitor, a registration for at least one security authorization hook. The method also includes receiving a callback when a protected event occurs. The method further includes communicating with the reference monitor that registered the at least one security authorization hook corresponding to the callback. The method also includes receiving, from the reference monitor, an access control decision associated with the protected event.

The subject matter described herein may be implemented in hardware, software, firmware, or any combination thereof. As such, the terms "function" "node" or "module" as used herein refer to hardware, which may also include software and/or firmware components, for implementing the feature being described. In one exemplary implementation, the subject matter described herein may be implemented using a computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

1 Introduction

Figure 1:
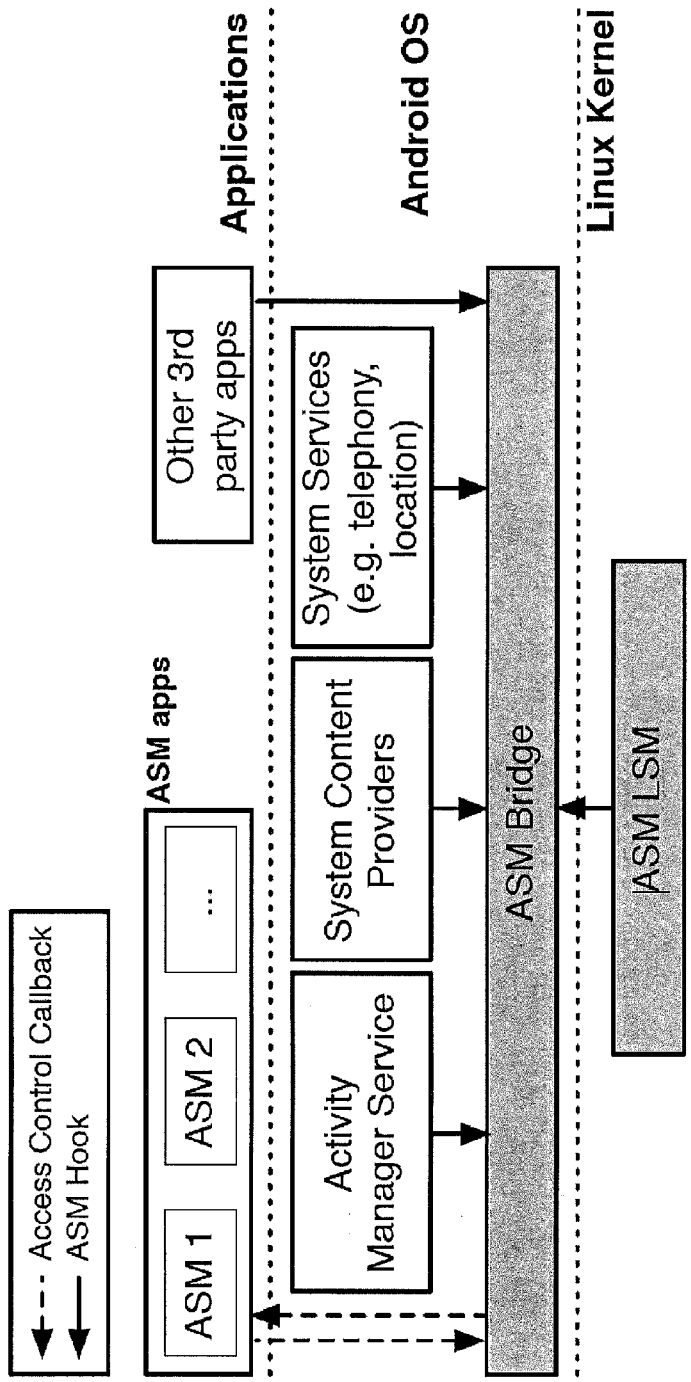
FIG. 1 is a diagram illustrating an Android Security Modules (ASM) architecture according to an embodiment of the subject matter described herein.

Consumer operating systems are changing. Android, iOS, and Windows place a high priority on the user-application experience. They provide new abstractions for developing user-applications: applications fill the screen; they have complex lifecycles that respond to user and system events; and they use semantically rich OS provided application programming interfaces (APIs) such as "get location," "take picture," and "search address book." The availability of these semantically rich OS APIs vastly simplifies application development, and has led to an explosive growth in the number and diversity of available applications.

These functional changes caused OS designers to rethink security. The new application abstractions both enable and necessitate assigning each user application to a unique protection domain, rather than executing all user applications with the user's ambient authority (the norm in traditional OSes such as Windows and UNIX). By default, each application's protection domain is small, often containing only the OS APIs deemed not to be security sensitive and the files it creates. The application must be granted capabilities to access the full set of semantically rich OS APIs. This security model provides a better approximation of least privilege, which limits both the impact of an exploited application, as well as the authority granted to a Trojan. However, how and when to grant these privileges has been the topic of much debate [16].

For the last several years, the security research community has contributed significant discourse on the right security architecture for these new operating systems. Android has been the focus of this discourse, mostly due to its open source foundation, widespread popularity for mobile devices, and the emergence of malware targeting it. In the relatively short period of time since the Android platform's initial release in 2008, there have been more than a dozen proposals for new Android security architectures [15, 24, 14, 23, 10, 7, 8, 37, 6, 19, 18, 12, 9, 22, 29]. While these security architecture proposals have very diverse motivations, their implementations often share hook placements and enforcement mechanisms.

The subject matter described herein includes various techniques, methods, and/or mechanisms for promoting OS security extensibility [33] in the Android platform. History has shown that simply providing type enforcement, information flow control, or capabilities does not meet the demands of all potential OS customers (e.g., consumers, enterprise, and government). Therefore, an extensible OS security interface must be programmable [33]. In short, we seek to accomplish for Android what the LSM [34] and TrustedBSD [32] frameworks have provided for Linux and BSD, respectively. What makes this task interesting and meaningful to the research community is the process of determining the correct semantics of authorization hooks for this new OS architecture.

The subject matter described herein includes various techniques, methods, and/or mechanisms associated with an Android Security Modules (ASM) framework, which provides a set of authorization hooks to build reference monitors for Android security. We survey over a dozen recent Android security architecture proposals to identify the hook semantics required of ASM. Of particular note, we identify the need to (1) replace data values in OS APIs, and (2) allow third-party applications to define new ASM hooks. We design and implement an open source version of ASM within Android version 4.4 and empirically demonstrate negligible overhead when no security module is loaded. ASM fulfills a strong need in the research community. It provides researchers a standardized interface for security architectures and will potentially lead to field enhancement of devices without modifying the system firmware (e.g., BYOD), if adopted by Google.

The subject matter described herein provides the following contributions:

We identify the authorization hook semantics required for new operating systems such as Android. The Android OS is responsible for enforcing more than just UNIX system calls. Android includes semantically rich OS APIs and new application lifecycle abstractions that must be included in OS access control. We also identify the need for authorization hooks to replace data values and for third-party applications to introduce new authorization hooks.

We design and implement the extensible Android Security Modules (ASM) framework. ASM brings OS security extensibility to Android. It allows multiple simultaneous ASM apps to enforce security requirements while minimizing performance overhead based on the required authorization hooks.

We implement two example ASM apps to demonstrate the utility of the ASM framework. ASM allowed the fast development of useful example ASM apps with functionalities similar to MockDroid [6] and password protected apps.

Finally, we envision multiple ways in which ASM can benefit the security community. ASM currently provides great value to researchers with the ability to modify the source code of a device. It provides a modular interface to define callbacks for a set of authorization hooks that provide mediation of important protection events. As the Android OS changes, only the ASM hook placements need to change, eliminating the need to port each research project to new versions. ASM can provide even greater benefit if it is adopted into the Android Open Source Project (AOSP): ASM apps can be added without source code modification. Ultimately, we envision an interface that allows enterprise IT and researchers to load ASM apps on production phones without root access.

The subject matter described herein proceeds as follows. Section 2 provides a short background on Android. Section 3 defines high level goals that underlie the ASM design. Section 4 surveys recent work enhancing Android security and identifies a common set of authorization hook semantics. Section 5 describes the ASM design. Section 6 evaluates the utility and performance of ASM. Section 7 highlights related work on OS security extensibility. Section 8 concludes.

2 Background

The Android OS is based on a Linux kernel, but provides a substantially different application abstraction than found in traditional Linux desktop and server distributions. Android applications are written in Java and compiled into a special DEX bytecode that executes in Android's Dalvik virtual machine. Applications may optionally contain native code components. Application functionality is divided into components. Android defines four types of components: activity, service, broadcast receiver, and content provider. The application's user interface is composed of a set of activity components. Service components act as daemons, providing background processing. Broadcast receiver components handle asynchronous messages. Content provider components are per-application data servers that are queried by other applications.

Application components communicate with one another using Binder interprocess communication (IPC). Binder provides message passing (called parcels) and thread management. In addition to data values, parcels can pass references to other binder objects as well as file descriptors. When an application holds a reference to a service component binder object, it can execute remote procedure calls (RPCs) for any methods defined by that service. Most of Android's semantically rich OS APIs are implemented as RPCs to OS defined service components. The OS also defines several content provider components (e.g., address book) that are queried using special RPC methods. It should be noted that while developers are encouraged to use Binder IPC, Android also supports standard Linux IPC mechanisms, for example domain sockets or pipes.

Applications often interface with Binder indirectly using intent messages. The intent message abstraction is used for communication between activity and broadcast receiver components, as well as starting service components. Intent messages can be addressed to implicit action strings that are resolved by the Activity Manager Service (AMS). Intent messages and action strings allow end users and OEMs to customize the applications used to perform tasks. The AMS resolves the desired target application and component, starting a new process or thread if necessary.

Android enforces component security requirements using permissions (i.e., text strings that represent capabilities). Android defines a set of core permissions for protecting OS resources and applications, but third-party application developers can define new permissions that are enforced using the same mechanisms as OS permissions. Permissions are granted to applications on install and stored in the Package Manager Service (PMS). Android places authorization hooks (implemented as a family of checkPermission( ) methods) in the AMS as well as OS service component RPC methods. checkPermission( ) is called along with the process identifier (PID) of the caller and the appropriate permission string. Calling checkPermission( ) invokes an RPC in the PMS, which returns granted if the caller's PID belongs to an application that is granted the permission, and throws a security exception if it is denied. However, not all permissions are enforced using checkPermission( ). Permissions that control access to low-level capabilities are mapped to Linux group identifiers (GIDs). Such capabilities include opening network sockets and accessing the SD card storage. For these permissions, corresponding GIDs are assigned to applications at installation time, and the kernel provides enforcement.

3 Design Goals

A secure operating system requires a reference monitor [2]. Ideally, a reference monitor provides three guarantees: complete mediation, tamperproofness, and verifiability. We seek to provide a foundation for building reference monitors in Android. As with LSM [34], the ASM only provides the reference monitor interface hooks upon which authorization modules are built. Furthermore, similar to the initial design of LSM, our ASM design manually places hooks throughout Android.

We seek to design a programmable interface for building new security enhancements to the Android platform. Our design is guided by the following goals.

G1 Generic authorization expressibility. We seek to provide the reference monitor interface hooks necessary to develop both prior and future security enhancements for Android. Not all authorization modules will use all hooks, and hooks may need to be placed at different levels to obtain sufficient enforcement semantics.

G2 Ensure existing security guarantees. Android provides sandboxing guarantees to application providers. Allowing third-parties to extend Android's security framework potentially breaks those guarantees. Therefore, ASM's reference monitor interface hooks should only make enforcement more restrictive (e.g., fewer permissions or less file system access). Note that by only allowing more restrictive enforcement, we lose expressibility (e.g., for capability models).

G3 Protect kernel integrity. As an explicit extension to Goal G2, we must maintain kernel integrity. Some authorization modules will require hooks within the Linux kernel. We cannot provide the LSM interface to third-parties without some controls. We explore several methods of exposing this functionality in Section 5.4.5.

G4 Multiple authorization modules. While there have been proposals for supporting multiple LSMs [26], official support for multiple authorization modules in Linux has not been adopted at the time of writing. We see benefit in allowing multiple ASM modules (e.g., personal and enterprise) and seek to design support for multiple authorization modules into the design of ASM. Achieving multiple authorization modules requires carefully designing the architecture to address potential conflicts.

G5 Minimize resource overhead. When no authorization module is loaded, ASM should have negligible impact on system resources (e.g., CPU performance, energy consumption). Furthermore, given the wide variety of authorization hook semantics, we recognize that not all authorization modules will require all hooks. Since some hooks have more overhead than others, we seek to design ASM such that different hooks can be enabled and disabled to minimize overhead.

Threat Model:

ASM assumes that the base Android OS and services are trusted. That is, our trusted computing base (TCB) includes the Linux kernel, the AMS, the PMS, and all OS service and content provider components. We assume that third-party applications have complete control over their process address spaces. That is, any authorization hooks placed in framework code that executes within the third-party application's process is untrusted. Finally, since third-party applications can include their own authorization hooks, they must be trusted to mediate the protection events they define.

TABLE 1

Classification of authorization hook semantics required by Android security enhancements

| System | Android ICC | Package Manager | Sensors/ Phone Info | Fake Data | System Content Providers | File Access | Network Access | Third Party Extension |
|---|---|---|---|---|---|---|---|---|
| MockDroid [6] |  | ✓ | ✓ | ✓ | ✓ |  | ✓ |  |
| XManDroid [7] | ✓ | ✓ | ✓ |  |  | ✓ | ✓ |  |
| TrustDroid [8] | ✓ | ✓ |  |  | ✓ | ✓ | ✓ |  |
| FlaskDroid [9] | ✓ | ✓ | ✓ | ✓ | ✓ | ✓ | ✓ | ✓ |
| CRePE [10] | ✓ |  | ✓ |  |  |  |  |  |
| Quire [12] | ✓ | ✓ |  |  |  |  |  |  |
| TaintDroid [14] | ✓ |  | ✓ |  |  | ✓ | ✓ |  |
| Kirin [15] |  | ✓ |  |  |  |  |  |  |
| IPC Inspection [18] | ✓ | ✓ |  |  |  |  |  |  |
| AppFence [19] | ✓ | ✓ | ✓ | ✓ | ✓ | ✓ | ✓ |  |
| Aquifer [22] | ✓ |  |  |  |  | ✓ | ✓ |  |
| APEX [23] | ✓ | ✓ | ✓ |  |  |  |  |  |
| Saint [24] | ✓ | ✓ |  |  |  |  |  | ✓ |
| SEAndroid [29] | ✓ | ✓ |  |  |  | ✓ | ✓ |  |
| TISSA [37] |  |  | ✓ | ✓ | ✓ |  |  |  |

4 Authorization Hook Semantics

The underlying motivation of ASM is to provide a programmable interface to extend Android security. Recently, Google adopted the UNIX-level portion of the SEAndroid [29] project into AOSP. However, Android security is significantly more complex than simply mediating UNIX system calls. Nearly all application communication occurs through Binder IPC, which from a UNIX perspective is an ioctl to /dev/binder. Mediating the higher level application communication has been the focus of most Android security research. The goal of this section is to explore these different proposals to identify a common set of authorization hooks semantics. That is, we seek to satisfy Goal 1 by surveying existing proposals to enhance Android security.

Academic and industry researchers have proposed many different security enhancements to the Android OS. These enhancements have a wide range of motivations. For example, Kirin [15] places constraints on permissions of applications being installed. Frameworks such as Saint [24], XManDroid [7] and TrustDroid [8] focus on mediating communication between components in different applications. FlaskDroid [9] and the aforementioned SEAndroid [29] project also mediate component interaction as a part of their enforcement. Aquifer [22] enforces information flow control policies that follow the user's UI workflow. IPC Inspection[18] and Quire [12] track Android intent messages through a chain of applications to prevent privilege escalation attacks. TaintDroid [14] and AppFence [19] dynamically track privacy sensitive information as it is used within an application. APEX [23] and CRePE [10] provide fine-grained permissions. TISSA [37], MockDroid [6], and AppFence [19] allow fine-grained policies as well as allow the substitution of fake information into Android APIs. While these proposals have diverse motivations, many share authorization hook semantics.

Table 1 classifies this prior work by authorization hook semantics. Nearly all of the proposals modify Android's Activity Manager Service (AMS) to provide additional constraints on Inter-Component Communication (ICC). The Package Manager Service (PMS) is also frequently modified to customize application permissions. Permissions are also occasionally customized by modifying the interfaces to device sensors and system content providers containing privacy sensitive information (e.g., address book). Several proposals also require authorization hooks for file and network access, which are enforced in the Linux kernel.

The table also denotes two areas that are nonstandard for OS reference monitors. The first hook semantics is the use of fake data. That is, instead of simply allowing or denying a protected operation, the hook must modify the value that is returned. This third option is often essential to protecting user privacy while maintaining usability. For example, the geographic coordinates of the north pole, or maybe a coarse city coordinates can be substituted for the devices actual location. Replacing unique identifiers (e.g. IMEI or IMSI) to combat advertising tracking is a further example. The second interesting hook semantics is the inclusion of third-party hooks. That is, a third-party application wishes the OS reference monitor to help enforce its security goals.

Finally, TaintDroid [14] and AppFence [19] use fine-grained taint tracking. They modify Android's Dalvik environment to track information within a process. However, dynamic taint tracking has false negatives, which may lead to access control circumvention. It also incurs more performance overhead than may be tolerable for some environments. In this work, we only consider mediation at the process level. Therefore, TaintDroid and AppFence cannot be built on top of ASM. However, this does not preclude researchers from combining TaintDroid with ASM.

5 ASM Design

The authorization hooks identified in the previous section describe semantically what to mediate, but not how to mediate it. Existing Android security enhancements define hooks in different ways, not all of which provide correct or complete mediation. ASM provides a reference monitor interface for building new reference monitors. By doing so, ASM allows reference monitor developers to focus on their novel security enhancements and not on placing hooks correctly. It also allows separate scrutiny of authorization hook placement that benefits all reference monitors built on top of ASM.

FIG. 1 is a diagram illustrating an ASM architecture 100 according to an embodiment of the subject matter described herein. Reference monitors (e.g., software or applications that act as a reference validation mechanism and/or may enforce an access control policy over an entity's (e.g., an application, a user, a process) ability to perform operations (e.g., read, write, access, etc.) on a computing system or objects therein) may be implemented as ASM apps. Each ASM app registers for a unique set of authorization hooks, specifying a callback for each. When a protected operation occurs, ASM automatically invokes the callback in the ASM app. The ASM reference monitor interface is contained within the ASM Bridge. In addition to managing ASM apps, the ASM Bridge receives protection events from authorization hooks placed throughout the Android OS. Since Android places functionality in multiple userspace processes, authorization hooks may notify the ASM Bridge only if the hook is explicitly enabled. ASM also supports authorization hooks within the Linux kernel. To achieve kernel authorization, a special ASM LSM performs upcalls to the ASM Bridge, again only doing so for hooks explicitly enabled.

This section details the design of the ASM framework. We use the following terminology. A protection event is an OS event requiring access control. Authorization hooks are placed throughout the Android OS, which invoke a callback in the ASM Bridge. The ASM Bridge defines reference monitor interface hooks, for which ASM apps register hook callbacks. Finally, we frequently refer to the ASM framework as a whole simply as ASM.

5.1 ASM Apps

Reference monitors are built as ASM apps. They are developed using the same conventions as other Android applications. The core part of an ASM app is a service component that implements the reference monitor hook interface provided by ASM. There are three main functionalities that must be provided within this service. Finally, the registration interface itself is protected by Android permissions.

ASM App Registration:

An ASM app must register itself with the ASM Bridge after it is installed. The time of registration depends on logic in the specific ASM app. For example, the ASM app could register itself automatically after install, or it could provide a user interface to enable and disable it. When the ASM Bridge receives the registration, it updates its persistent configuration. To activate the ASM app, the device must reboot. We require a reboot to ensure ASM apps receive all protection events since boot, which may impact their protection state.

Hook Registration:

The ASM app service component is started by ASM during the boot process. At this time, the ASM app registers for reference monitor interface hooks for which it wishes to receive callbacks. Different hooks incur different overheads.

In some embodiments, ASM may only enable a reference monitor hook if it is registered by an ASM app. In such embodiments, ASM app developers should only register for the hooks required for complete mediation. Finally, if the ASM registers for hooks defined by a third-party application (Section 5.4.4), the application developer and the ASM app developer must agree on naming conventions.

Handling Hook Callbacks:

Once an ASM app registers for a reference monitor interface hook, it will receive a callback whenever the corresponding protection event occurs. The information provided in the callback is hook-specific. The ASM app returns the access control decision to the ASM Bridge. As discussed in Section 5.3, some hooks allow the callback to replace data values. Finally, similar to registration for third-party hooks, the ASM app developer must coordinate with the application developer for information passed to the callback.

Registration Protection:

Reference monitors are highly privileged. While ASM does not allow an ASM app to override existing Android security protections (Goal 2), ASM must still protect the ability to receive callbacks. ASM protects callbacks using Android's existing permission model. It defines two permissions: REGISTER_ASM and REGISTER_ASM_MODIFY. The ASM Bridge ensures that an ASM app has the REGISTER_ASM permission during both ASM app registration and hook registration. Finally, since replacing data values in an access control callback has greater security implications, the ASM Bridge ensures the ASM app has the REGISTER_ASM_MODIFY permission if it registers for a hook that allows data modification. This allows easy ASM app inspection to identify its abilities.

ASM App Deployment:

How the ASM permissions are granted has a significant impact on the practical security of devices. Previous studies [16] have demonstrated that end users frequently do not read or understand Android's install time permissions. Therefore, malware may attempt to exploit user comprehension of permissions and gain ASM app privileges. To some extent, this threat is mitigated by our goal to ensure existing security guarantees (Goal 2). Different ASM app deployment models can also mitigate malware. In the use case where researchers change AOSP source code, these permissions can be bound to the firmware signing key, thereby only allowing the researchers' ASM apps to be granted access. In the case where ASM is deployed on production devices, ASM could follow the security model used by device administration API. That is, a secure setting that is only modifiable by users would enable whether ASM apps can be used. An alternative is to use a model similar to Android's "Unknown sources" setting for installing applications. That is, unless a secure user setting is selected, only Google certified ASM apps can be installed.

5.2 ASM Bridge

The ASM Bridge 1) provides the reference monitor interface, and coordinates protection events that occur in authorization hooks placed throughout the Android OS, as well as third-party applications. As discussed in Section 5.1, ASM apps notify the ASM Bridge of their existence via an ASM app registration followed by individual hook registrations. We now discuss several reference monitor interface considerations.

Per-Hook Activation:

All reference monitor interface hooks are deactivated by default. Each authorization hook maintains an activation state variable that determines whether or not the ASM Bridge is notified of protection events. This approach eliminates unnecessary IPC and therefore improves performance (Goal 5) when no ASM app requires a specific hook. Likewise, this approach allows ASM to achieve negligible overheard when no ASM apps are loaded (see Section 6.2).

When an ASM app registers a callback for a deactivated hook, the ASM Bridge activates the hook by notifying the corresponding authorization hook implementation. ASM maintains a list of active hooks in each OS component (e.g., OS service component, OS content provider component). When a protection event occurs, the OS component creates an access control bundle that is sent to the ASM Bridge. When the ASM Bridge receives the access control bundle for a hook, it is forwarded to each ASM app that registered for the hook. Similarly, the ASM LSM in the kernel (Section 5.4.5) maintains a separate activation state variable per hook and performs an upcall for each protection event.

Callback Timeouts:

The ASM Bridge is notified of protection events via synchronous communication. Authorization hooks in userspace communicate with the ASM Bridge using Binder IPC, and the ASM LSM uses synchronous upcalls, as described in Section 5.4.5. The ASM Bridge then uses synchronous Binder IPC to invoke all ASM app callbacks for the hook corresponding to the protection event. If the ASM app callback implementation is buggy, the authorization hook may stall execution. Therefore, ASM has the ability to set timeouts on callback execution. If a timeout occurs, the ASM Bridge conservatively assumes access is denied.

Master Policy:

ASM supports multiple simultaneous ASM apps (Goal 4). This goal is motivated by multi-stakeholder scenarios, e.g. users, administrators, and device manufacturers installing ASM apps on a device. When more than one ASM app is active, a reconciliation strategy is required to handle potential conflicts between access control decisions. The correct conflict resolution strategy is highly use-case specific. Therefore, providing a general solution is infeasible [9].

ASM addresses this problem using a master policy that defines policy conflict reconciliation. For our implementation and evaluation, we use a consensus strategy. That is, all active ASM apps must grant an access control decision for the action to be allowed. Similar to FlaskDroid [9], the master policy can be easily modified to support other conflict resolution strategies [26, 21]. For example, a priority-based resolution policy hierarchically orders ASM apps, and a voting policy allows an action if a specified threshold of ASM apps grant it.

5.3 Callbacks Modifying Data

Before discussing the reference monitor interface hooks provided by ASM, we must describe one last concept. While most ASM apps require a simple allow/deny access control interface, some may benefit from the ability to modify data values. For example, MockDroid [6] modifies values (e.g., IMEI, location) returned by OS APIs before they are sent to applications. ASM supports data modifications by providing a special hook type.

Each reference monitor interface hook that potentially requires data replacement is split into two variants: 1) normal, which allows the corresponding callback to simply allow or deny the event, and 2) modify, which allows the corresponding callback to modify the value returned by the OS API or content provider, in addition to specifying allow or deny. As mentioned in Section 5.1, modifying data has a greater security sensitivity, and therefore registration of a modify callback requires the REGISTER_ASM_MODIFY permission.

Figure 2:
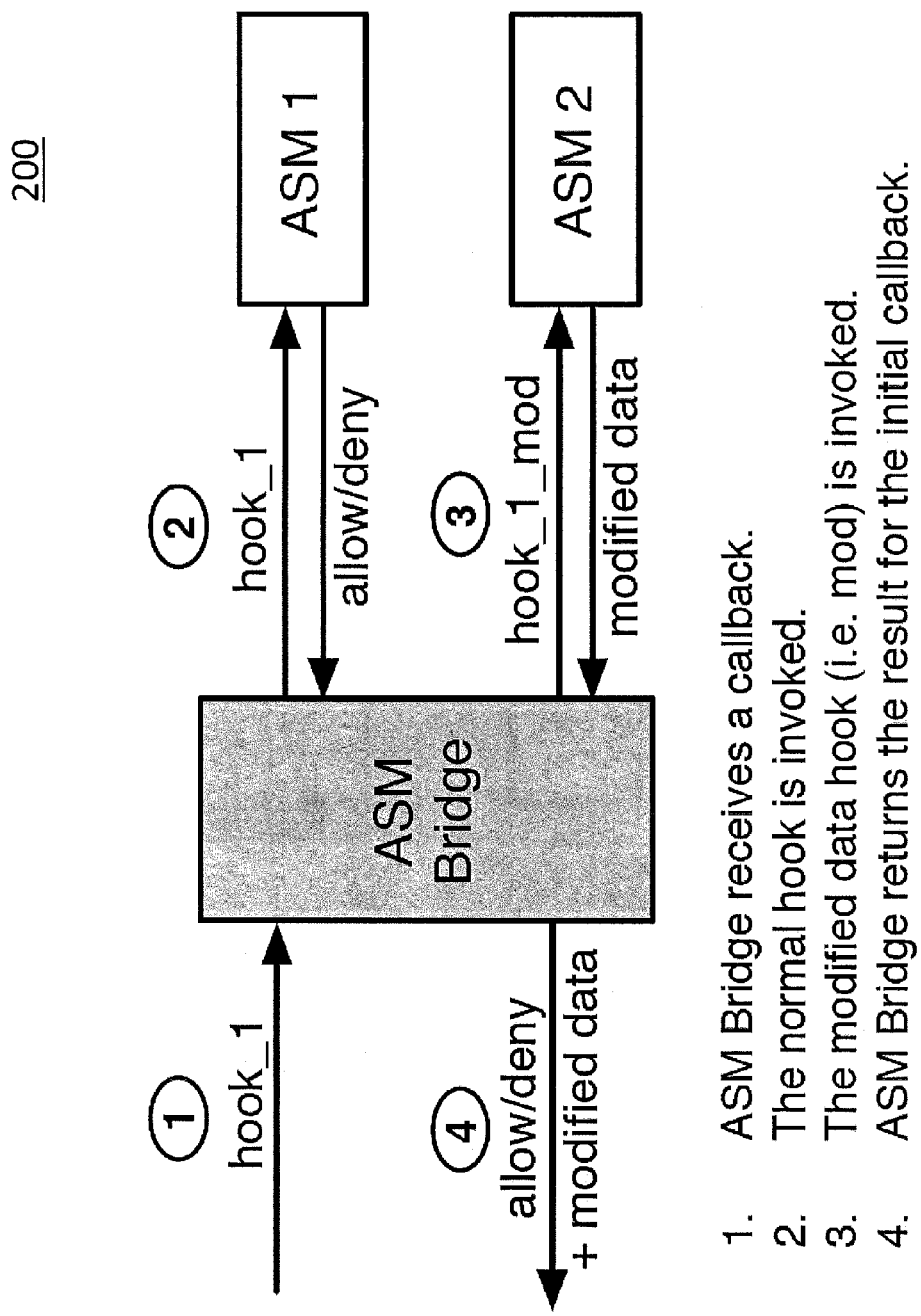
FIG. 2 is a diagram illustrating an ASM hook invocation according to an embodiment of the subject matter described herein.

FIG. 2 is a diagram illustrating an ASM hook invocation 200 according to an embodiment of the subject matter described herein. At step 1, an ASM bridge may receive a callback. At step 2, a normal hook may be invoked. At step 3, a modified data hook may be invoked. At step 4, the ASM Bridge may return the result (e.g., access control decisions from multiple reference monitors, such as ASM 1 and ASM 2) for the initial callback.

In some embodiments, the ASM Bridge may manage various types of hooks, e.g., normal and modify hooks. To reduce the overhead of handling authorization hooks, the ASM Bridge may be notified once per protection event. The ASM Bridge then manages the normal and modify versions, returning the access control decision and modified data value (if needed) to the authorization hook. Additionally, the ASM Bridge invokes all of the normal callbacks before the modify versions. This approach allows a performance improvement if a consensus master policy is used (Section 5.2). In this case, if a normal hook denies access, the modify callbacks do not need to be called.

---
Listing 1: Example Callback Prototypes Modifying Data
---

```
1 // Callback received by the ASM Bridge:
2 int start_act(inout Intent intent, in String
    resolvedType, in ActivityInfo activity, int
    requestCode, int callingPid, int callingUid);
3 // Callback to individual ASMs (No modify data):
4 int start_act(in Intent intent, in String
    resolvedType, in ActivityInfo activity, int
    requestCode, int callingPid, int callingUid);
5 // Callback to individual ASMs (Modify data):
6 int start_act_mod(in Intent intent, inout Bundle
    extras, in String resolvedType, in ActivityInfo
    activity, int requestCode, int callingPid, int
    callingUid);
```

Example 1

Listing 1 explains this distinction further via example. The listing shows the callback prototypes for the start_activity protection event. The first prototype shown, start_act( ), is the ASM Bridge callback used by the authorization hook in the Activity Stack subsystem of Android's AMS. This hook is invoked after intent resolution but before the chosen activity component is started. The hook includes 1) the intent message from the caller, 2) information about the activity to be started, 3) the caller's identity, and 4) additional information for the current event. By marking intent as inout (a directive defined in the Android Interface Definition Language), the ASM Bridge can modify it.

The ASM Bridge splits start_act( ) into the normal and modify versions. To ensure restrictive enforcement, ASM apps can modify only the extras field supplied by the caller. It cannot modify information that has been reviewed by the user or the OS, such as the action string or the target activity. To ensure this restriction, the ASM Bridge makes the intent immutable, but supplies a mutable Bundle of extras extracted from the intent to the ASMs registered for the modify data hook. The modified extras received by the ASM Bridge are then set back to the intent before the initial callback from the Activity Stack to the ASM Bridge returns.

5.4 Hook Types

ASM provides a reference monitor interface for authorization hooks placed throughout the Android OS. We now describe five general categories of hooks: 1) lifecycle hooks, 2) OS service hooks, 3) OS content provider hooks, 4) third-party app hooks, and 5) LSM hooks.

5.4.1 Lifecycle Hooks

ASM provides reference monitor hooks for component lifecycle events in the Activity Manager Service, the AMS subsystems, and the Package Manager Service. Hooks in this category include: resolving intents, starting activities and services, binding to services, dynamic registration of broadcast receivers, and receiving broadcast intents. We demonstrate the lifecycle hook category with the following example. Note that Example 2 is also a lifecycle hook.

---
Listing 2: Resolve Activity Hook
---

```
1 // Callback received by the ASM Bridge:
2 int resolveActivity_mod(inout List<ResolveInfo>
    resolvedList, in String resolvedtype, int userId,
    inout Intent intent, int callingPid, int callingUid);
3 // Callback to individual ASM apps (Modify data):
4 int resolveActivity_mod(inout List<ResolveInfo>
    resolvedList, in String resolvedtype, int userId, in
    Intent intent, int callingPid, int callingUid, inout
    Bundle extras);
```

Example 2

The resolve_activity protection event occurs within the Package Manager Service. The ASM authorization hook for resolve_activity is placed in the PMS after the intent has been resolved by the OS, but before a chooser with the resolved activities is presented to the user. This hook is motivated by systems such as Saint [24] and Aquifer [22], which refine the list of resolved applications based on access control policies. Note that refining the chooser list requires data modification, and therefore, resolve_activity may be one of a few hooks that only provide a modify version.

Listing 2 shows the callback prototypes defined for resolve_activity. The callback received by the ASM Bridge from the Android OS contains the list of resolved components. The ASM Bridge then executes an RPC to the ASM app callbacks registered for this hook. The RPC provides a modifiable resolved component list and Bundle extras. The other parameters are immutable. It is important to prevent the ASM from adding new apps to the list, thereby overriding the OS's restrictions (Goal 2). Therefore, we compute the set intersection of the original list and the modified list, and return the result to the authorization hook. When multiple ASM apps register for this hook, the ASM Bridge calls the hook callback for each ASM app, providing the modified data from the previous invocation as input.

5.4.2 OS Service Hooks

Lifecycle hooks include mediation for inter-component communication using intent messages. However, ASM apps also require mediation for OS APIs providing functionality such as getting the geographic location and taking pictures.

Android implements this functionality in different service components designated as system services, e.g., location and telephony services.

ASM uses Android's AppOps subsystem to place the authorization hooks for many OS service hooks. AppOps is a very recent addition to AOSP. While there have been several popular media stories of hobbyist developers using AppOps to control per-application permissions, AppOps remains largely undocumented and is not yet available for public use. Based on our code inspection, AppOps appears to be an effort by Google to provide more flexible control of permission related events. Conceptually, AppOps is an Android security enhancement and could be implemented as an ASM app. We discuss AppOps as an ASM app further in Section 7.

The ASM authorization hooks for services use the AppOps syntax. AppOps defines opcodes for different operations, e.g., OP_READ_CONTACTS or OP_SEND_SMS. To identify the application performing an operation, the Linux uid and the package name of the application are used. ASM uses a single authorization hook in AppOps to call the ASM Bridge. The ASM Bridge decodes the opcode and translates it into an ASM hook.

AppOps supports graceful enforcement. That is, it returns empty data instead of throwing a Security Exception wherever possible (e.g., in Cursors). As a result, apps do not crash when they are denied access to resources. On the other hand, AppOps does not allow data values to be modified at runtime. Therefore, ASM adds specific data modification hooks. We also needed to extend AppOps with several hooks for privacy sensitive operations (e.g., getDeviceId( ), onLocationChanged( ). We now discuss two examples, including both regular AppOps hooks and ASM's data modification hooks.

---

Listing 3: AppOps Hook for Sending SMS

```
1 // Callback received by the ASM Bridge:
2 int appOpsQuery(int opcode, int callingUid, String
    packageName);
3 // Here, opcode = OP_SEND_SMS
4 // Callback to individual ASMs:
5 int sendSms(int callingUid, String packageName);
```

Example 3

Listing 3 shows the callback prototype for the AppOps hook for sending an SMS (OP_SEND_SMS). The ASM Bridge receives the generic appOpsQuery( ) callback and translates the opcode to the sendSms( ) hook. ASM apps registered for the sendSms( ) hook receive a callback whenever an SMS message is sent.

---

Listing 4: getDeviceId Hook

```
1 // Callback received by the ASM Bridge:
2 int getDeviceId(int callingUid, out String[ ]
    device_ids);
3 // Callback to individual ASMs (Modify data):
4 int getDeviceId_mod(int callingUid, out String[ ]
    device_ids);
```

Example 4

Listing 4 shows the data modification callback prototype for the getDeviceId( ) OS API call in the PhoneSubInfo (i.e., telephony) service. The ASM Bridge receives a callback from the authorization hook and executes the getDeviceId_mod( ) callback in ASM apps. ASM apps receiving this callback can return deny or allow. If the return value is allow, the ASM app can also place a custom value in the first index of the device_ids array. This value will be sent to the Android application that invoked getDeviceId( ), instead of the real device ID.

5.4.3 Content Provider Hooks

Content provider components are daemons that provide a relational database interface for sharing information with other applications. The ASM Bridge receives callbacks from the OS content provider components (e.g., Calendar, Contacts, and Telephony). Separate hooks are required for the insert, update, delete and query functions. Authorization hooks for insert, update and delete must be invoked before the action is performed, to preserve the integrity of the provider's data. In contrast, the query function's hook is invoked after the execution, to allow filtering of the returned data.

The content provider query RPC returns a database Cursor object. The Cursor object not a parcelable type, and therefore the entire query response is not returned to the caller in a single Binder message. Therefore, ASM apps cannot filter the query. To account for this, we extract the Cursor contents into a parcelable ASMCursor wrapper around a CursorWindow object to include in the callback to the ASM Bridge.

The following example demonstrates the query interface. In some embodiments, ASM may provide normal (i.e., no data modification) hooks for insert, delete, and update.

---

Listing 5: CallLogProvider query hook

```
1 // Callback received by the ASM Bridge:
2 int callLogQuery(inout ASMCursor cursor, in Uri uri,
    in String[ ] projection, in String selection, in
    String[ ] selectionArgs, in String sortOrder, int
    callingUid, int callingPid);
3 // Callback to individual ASMs (No modify data):
4 int callLogQuery(in ASMCursor cursor, in Uri uri, in
    String[ ] projection, in String selection, in String[ ]
    selectionArgs, in String sortOrder, int callingUid,
    int callingUid);
5 // Callback to individual ASMs (Modify data):
6 int callLogQuery_mod(inout ASMCursor cTemp, in Uri
    uri, in String[ ] projection, in String selection, in
    String[ ] selectionArgs, in String sortOrder, int
    callingUid, int callingPid);
```

Example 5

Listing 5 shows the callback prototypes for the CallLogProvider OS content provider. The ASM Bridge receives the original query and the result wrapped in an ASMCursor. The callback is split into normal and modify hook variants. ASM apps that register for the normal hook get read access to the query and the result. ASM apps registered for the data modify hook can also modify the ASMCursor object. Both the hooks return allow and deny decisions via the return value.

Finally, we note that this use of a CursorWindow object to copy the entire content provider query response into the ASM hook may lead to additional overhead when query responses are large. This is because Android uses a lazy retrieval of Cursor contents, only transferring portions of the response over Binder IPC as needed. One way to improve ASM query performance is to intercept the actual data access via Binder to modify data, rather than serializing the entire response. However, this will increase the number of callbacks to ASM apps, resulting in a trade-off. We will explore this and other methods of performance improvement in future work.

5.4.4 Third Party Hooks

ASM allows third-party Android applications to dynamically add hooks to the ASM Bridge. These hooks are valuable for extending enforcement into Google and device manufacturer applications (which are not in AOSP), as well as third-party applications downloaded from application markets (e.g., Google Play Store). Third-party hooks are identified by 1) a hook name, and 2) the package name of the application implementing the authorization hook. The complete hook name is a character string of the format package_name:hook_name. This naming convention provides third parties with their own namespaces for hooks. Note that third parties do not specify their package name; ASM obtains it using the registering application's uid received from Binder.

Listing 6: Third Party Hooks

```
1 // Callbacks received by the ASM Bridge:
2 int hook_handler(in String name, in Bundle b);
3 int hook_handler_mod(in String name, inout Bundle b);
4 // Callback to individual ASMs (No modify data):
5 int hook_handler(in String name, in Bundle b);
6 // Callback to individual ASMs (Modify data):
7 int hook_handler_mod(in String name, inout Bundle b);
```

To receive callbacks for third-party hooks, ASM apps implement two generic third-party hook methods, shown in Listing 6. One method handles normal hook callbacks; the other method handles data modification hook callbacks. When the third-party application's authorization hook calls the ASM Bridge callback, it passes a generic Bundle object. The ASM forwards the Bundle to registered ASM apps for access control decisions. As with other ASM authorization hooks, third-party hooks may be activated when an ASM app registers for it.

ASM apps receive hook callbacks for all of their registered third-party hooks via a single interface (technically two callbacks, as in Listing 6). Within this callback, ASM apps must identify the third-party hook by name and must interpret the data in the Bundle based on the third-party application's specification. We assume that ASM apps that register for third-party hooks are aware of the absolute hook name and the contained attributes. The ASM app returns allow, deny, or allow along with a modification of the Bundle (for data modification hooks).

Finally, the third-party application developer must implement a special service component to receive hook activation and deactivation callbacks from the ASM Bridge. The ASM Bridge sends messages to this service to update the status of a hook. Third-party application developers must follow the message codes exposed by ASM for proper hook management.

5.4.5 LSM Hooks

ASM apps sometimes require mediation of UNIX-level objects such as files and network sockets. ASM cannot define authorization hooks for such objects in the userspace portion of the Android OS. Instead, authorization hooks must be placed in the Linux kernel. Fortunately, the Linux kernel already has the LSM reference monitor interface for defining kernel reference monitors. For example, file_permission and socket_connect LSM hooks mediate file and network socket operations, respectively.

The main consideration for ASM is how to allow ASM apps to interface with these LSM hooks. Several potential approaches exist. First, ASM could allow ASM apps to load LSM kernel modules directly. This approach is appropriate when the ASM app developer also has the ability to rebuild the device firmware. For example, one target audience for ASM is security researchers prototyping new reference monitors. In this case, the ASM app developer can create userspace and kernel components and provide communication between the two.

However, we would like to also allow ASM apps to mediate kernel-level objects without rebuilding the device firmware. Therefore, a second option is to develop a small mediation programming language that is interpreted by an ASM LSM. In this model, the ASM app developer programs access control logic within the interpreted language, and the logic is loaded along with the ASM on boot. Using an interpreted language would ensure kernel integrity (Goal G3).

Our current implementation uses a third option. We define a special ASM LSM that implements LSM hooks and performs synchronous upcalls to the ASM Bridge to complete the access control decision. Consistent with the rest of the ASM design, the upcall may be activated when an ASM app registers for the corresponding reference monitor hook. To integrate our ASM LSM into the kernel without removing SEAndroid (Goal G2), we used an unofficial multi-LSM patch [27]. We implemented authorization hooks for many commonly used LSM hooks, including file_permission and socket_connect.

While the upcall approach initially sounds like it would have very slow performance, our key observation is that many ASM apps will require very few, if any, LSM hooks. For example, an ASM app for Aquifer [22] may require the file_permission and socket_connect LSM hooks. Section 6.2 shows that both of the aforementioned hooks can be evaluated in userspace with reasonable performance overhead. Furthermore, placing all ASM app logic in one place (i.e., userspace) simplifies reference monitor design.

To improve access performance for large files, we implemented a cache with an expiration policy, where file accesses (euid, pid, inode, access_mask) and decisions received from ASM apps on those accesses are cached; and are invalidated if the accesses do not repeat within a timeout period of 1 millisecond (ms). Since we cache and match the file inode as well as the accessing subject's effective uid and pid, we do not provide an attacker the opportunity of taking advantage of a race condition (i.e., requesting for a file less than 1 ms after its access is granted).

Note that this approach may lead to a case where file access control is too coarse grained for a particular ASM app. For example, consider a situation where an application on the device reads a file continuously. An ASM app grants this application access, but if at some point during these accesses it wants to deny the access to this file, the file_permission hook is not triggered since the file is read before the timeout expires resulting in cache hits. To address this problem, we allow ASM apps to set this timeout. If multiple ASM apps set a timeout, the master policy can determine the timeout, e.g., the smallest timeout. ASM apps may also disable the cache, which provides all file access control callbacks to the ASM, but also degrades the performance of file reads.

5.5 ASM LSM

Finally, the ASM LSM provides two security features in addition to the LSM hook upcalls. First, it implements the task kill LSM hook to prevent registered ASM apps from being killed. As we discuss in Section 6.1, some existing security enhancements can be disabled by killing their processes. Second, it implements the inode_*xattr LSM hooks to provide ASM apps access to their own unique extended attribute namespaces. That is, an ASM app can use file xattrs with a prefix matching its package name. No other applications can access these xattrs. File xattrs are needed by security enhancements such as Aquifer [22].

6 Evaluation

We evaluate the ASM framework in two ways. First, we evaluate the utility of ASM via case study by implementing two recent security enhancements for Android as ASM apps. Second, we evaluate the resource impact of ASM with respect to both performance and energy consumption. We implemented ASM on Android version 4.4.1, hence we use the Android 4.4.1 AOSP build as our baseline. All the experiments were performed on an LG Nexus 4 (GSM). The source code for ASM is available at http://androidsecuritymodules.org.

6.1 Case Studies

In this section, we evaluate the utility of ASM by implementing existing security solutions as ASM apps. We implement and study two examples: 1) MockDroid [6] and 2) AppLock [13]. Finally, we conclude this section with a summary of lessons learned.

6.1.1 MockDroid

MockDroid [6] is a system-centric security extension for the Android OS that allows users to gracefully revoke the privileges requested by an application without the app crashing. To do so, MockDroid provides a graphical user interface that allows the user to decide whether individual applications are presented real or fake responses when accessing sensitive system components.

Original Implementation:

MockDroid extends Android's permissions model for accessing sensitive services by providing alternative "mock" versions. When users install an application, they choose to use the real or mock version of permissions. However, users can also revise this decision later using a graphical user interface. MockDroid stores the mapping between applications and permissions in an extension to Android's Package Manager Service. This policy store is the primary policy decision point in MockDroid.

MockDroid places enforcement logic in relevant Android OS components, as well as the kernel. If an application is assigned a mock permission, the Android OS component will return fake information. For example, if an application attempts to get the device IMEI, and it is assigned the mock version of READ_PHONE_STATE, then the telephony service will return a fake static IMEI instead of the device's real IMEI.

MockDroid also modifies the Linux kernel with enforcement logic. Recall from Section 2 that some permissions are enforced in the Linux kernel based on GIDs assigned to applications. MockDroid defines additional GIDs for mock permissions enforced by GID. For example, if the user selects to assign the mock version of the INTERNET permission to an application, it is assigned to the mock_inet group instead of the inet group. To enforce this mock permission, MockDroid modifies the inet runtime check in the Linux kernel (a check added by Android to Linux). In the modified check, if the application is in the mock_inet group, a socket timeout error is returned, simulating an unavailable network server.

MockDroidASM:

We implemented an ASM app version of MockDroid called MockDroidASM. In addition to ASM permissions for hook registration, MockDroidASM must register for the PACKAGE_INSTALL hook to receive the package name and the list of requested permissions when each new application is installed. A MockDroidASM GUI also allows the user to configure which permissions to gracefully revoke from an application (e.g., INTERNET, READ_PHONE_STATE).

Instead of using additional mock permissions, MockDroidASM registers for the modify version of ASM hooks that are triggered when an application attempts to access sensitive system components. Since MockDroidASM needs to modify values returned to apps, it requests the REGISTER_ASM_MODIFY permission, as described in Section 5.3.

Table 2 shows the most important hooks used by MockDroidASM. For example, the device_id_mod hook allows MockDroidASM to fake the IMEI number of the device. On the kernel-level, MockDroidASM registers for the socket_connect hook to receive a callback when an application tries to connect to a network server. If INTERNET is revoked by the user, the MockDroidASM returns deny to the ASM LSM, which returns a socket timeout error to the application.

6.1.2 AppLock

AppLock [13] is an application available on the Google Play Store. It allows users to protect the user interface components of applications with a password. Users set a password to access the AppLock. They then selectively lock other third-party and system applications through AppLock's user interface. When the user tries to open a protected application, AppLock presents a password prompt, and the user must enter the correct password before the application can be used.

Original Implementation:

AppLock requests install-time permissions for 1) getting the list of running apps, 2) overlaying its user interface over other applications, and 3) killing application processes. While AppLock does not require any modifications to Android's source code, it is uses energy very inefficiently. It can also be circumvented using an ADB shell (e.g., "am force-stop com.domobile.applock").

AppLock's LockService uses a busy loop to continuously query the Android operating system for the list of running applications while the screen is on. If the top application is protected by AppLock's policy, LockService overlays the current screen with a password prompt user interface. This interface stays on the screen, trapping all input until the correct password is entered. If the user decides to return from the lock screen without entering his password, AppLock kills the protected application. We have verified this execution via static analysis using ApkTool [1] as well as with another monitoring ASM app that registers for the start service hook.

AppLockASM:

We implemented an ASM app version of AppLock called AppLockASM. To provide the password-protected application functionality, AppLockASM simply registers for the start_activity hook. It then receives a callback whenever an activity component is started. When this occurs, AppLockASM displays its own lock screen. If the user enters the correct password, the start_activity event is allowed. If the user decides not to enter a password, it is denied. Unlike AppLock, AppLockASM never starts the target activity component without the correct password.

6.1.3 Summary

ASM considerably simplifies development of security modules such as AppLock and MockDroid. For example, the original AppLock app performs its functionality by starting a service in an infinite loop, a design that is inefficient in terms of power as well as latency. AppLockASM on the other hand needs to simply register for a callback with the ASM Framework. The AppLock implementation also prompts a lock screen after the app has already been started, and has to kill the app when the lock screen returns. This arbitrary killing of apps is prevented in the AppLockASM case, where the callback happens before the activity is started, and the activity may start only if the AppLockASM allows. This is also beneficial from the security point of view, as an AppLockASM-like app does not need to register for the permission to kill other apps, reducing the risk in case the locking app itself is malicious or malfunctions.

The original MockDroid implementation requires modifications to the Package Manager Service, and has to implement an entire parallel mock permission framework. This effort can be reduced by registering for a small number of ASM hooks, without having to modify system services.

A general lesson learned from these case studies is that the ASM architecture enables developers to easily implement complex system-centric security enhancements without the need for third party support. This broadens the outreach of ASM, and encourages third-party developers to engage in the development of sophisticated security solutions for Android-based devices.

6.2 Performance Overhead

To understand the performance implications of ASM, we micro benchmarked the most common ASM protection events for modules in Table 1. We performed each experiment 50 times in three execution environments: 1) AOSP, 2) ASM with no ASM app, and 3) ASM with one ASM app. The ASM app may register for the callback of the tested protection event; all other callbacks may remain deactivated. Since we are interested in the performance overhead caused by framework, our test callback immediately returns allow. Table 3 shows the mean results with the 95% confidence intervals.

TABLE 3

Performance - Unmodified AOSP, ASM with no reference monitor, and ASM with a reference monitor app

| | | ASM (ms) | | Overhead (%) | | Overhead (ms) | |
|---|---|---|---|---|---|---|---|
| Protection Event | AOSP (ms) | w/o ASM app | w/ ASM app | w/o ASM app | w/ ASM app | w/o ASM app | w/ ASM app |
| Start Activity | 19.03 ± 1.51 | 20.01 ± 1.39 | 22.74 ± 1.77 | 5.15 | 19.50 | 0.98 | 3.71 |
| Start Service | 3.89 ± 0.31 | 4.6 ± 0.41 | 8.42 ± 0.61 | 18.25 | 116.45 | 0.71 | 4.53 |
| Send Broadcast | 2.18 ± 0.24 | 4.48 ± 0.69 | 6.45 ± 0.55 | 105.50 | 196.71 | 2.30 | 4.27 |
| Contacts Insert | 121.41 ± 5.98 | 120.48 ± 5.25 | 135.39 ± 6.35 | −0.76 | 11.51 | −0.93 | 13.98 |
| Contacts Query | 17.41 ± 3.88 | 21.10 ± 3.13 | 29.50 ± 4.36 | 21.19 | 69.44 | 3.69 | 12.09 |
| File Read | 59.13 ± 1.97 | 62.27 ± 2.86 | 65.39 ± 2.93 | 5.31 | 10.59 | 3.14 | 6.26 |
| File Write | 57.68 ± 3.01 | 57.98 ± 2.76 | 59.03 ± 3.60 | 0.52 | 2.34 | 0.30 | 1.35 |
| Socket Create | 0.65 ± 0.086 | 0.79 ± 0.13 | 4.26 ± 0.56 | 21.54 | 555.38 | 0.14 | 3.61 |
| Socket Connect | 1.61 ± 0.21 | 1.65 ± 0.22 | 5.13 ± 0.32 | 2.48 | 218.63 | 0.04 | 3.52 |
| Socket Bind | 2.00 ± 0.17 | 1.93 ± 0.64 | 5.15 ± 0.34 | −3.5 | 157.50 | −0.07 | 3.15 |

Lifecycle Protection Events:

To test lifecycle protection events (i.e., start activity, start service, and send broadcast), we created an intent message and added a byte array as its data payload (i.e., extras Bundle). Each test type registered for the modify version of the ASM hook. We sent the intent for the respective type, pausing for five seconds between consecutive executions. Potential areas of overhead for using the hook include: 1) cost of establishing two additional IPCs, 2) marshalling and unmarshalling this data across the two IPCs, 3) ASM copying the extras Bundle when sending it to the ASM app, and 4) setting the returned Bundle back to the original intent. To estimate worst case performance, we chose a very large array (4 KB) and registered our test ASM for modify data hooks. This worst case overhead, though relatively high, is not noticeable by the user due to its low absolute value. Additionally, most applications use files to share very large data values. We note that while send broadcast has a high overhead percentage, the wall clock overhead is in the order of milliseconds, which is negligible overhead for broadcasts.

Content Provider Protection Events:

Micro benchmarks for content providers were performed on the Contacts Provider. For this experiment, our ASM app registers for the contacts_insert callback. It proceeds to insert a new contact (first and last name) into the contacts database exposed by the ContactsProvider. The overhead observed is 11.51% and negligible in terms of its absolute value. We then registered for the contacts_query_mod hook, and performed a query on the same contact. Query has a greater overhead, which is attributable to marshalling/unmarshalling the data between the two IPC calls, and serialization of the Cursor object into a parcelable. A major cause of this overhead is also that the Content Provider Cursor is not populated when the query result is returned to the calling application, but is instead filled as and when the application uses it to retrieved values. As discussed in Section 5.4.3, future work will consider alternative methods of mediating query responses.

File Access Protection Events:

File micro benchmarks tested the file_permission hook, which uses an upcall from the kernel. To test file access performance, our test app performs an access (read/write) on a 5 MB file. We pause for a second between successive executions. For writes, we do not see considerable overhead as the file is written in one shot to disk. Reads used a 16 KB buffer and the default 1 ms expiration time for caching access control decisions, as discussed Section 5.4.5.

Socket Protection Events:

For socket operations, we tested the performance overhead for creating, binding and connecting to an IPv6 socket. Our test ASM app registered for the socket_create, socket_bind, and socket_connect callbacks. The absolute overhead is mainly caused by the callback to the userspace, and is a constant overhead for socket operations.

6.3 Energy Consumption

Energy consumption is a growing concern for mobile devices. To measure ASM's impact on energy consumption, we perform energy measurements in same three test environments as performance: 1) AOSP, 2) ASM with no ASM app, 3) ASM with one ASM app. The ASM app registers for all the hooks from the performance experiments. We use the Trepn profiler 4.1 [25] provided by Qualcomm to perform power measurements. Trepn uses an interface exposed by the Linux kernel to the power management IC used on the System on a Chip to measure energy consumption, a feature that is supported on a limited set of devices, including the LG Nexus 4. Trepn samples power consumption measurements every 100 ms. Average values are shown in the Table 4.

TABLE 4

Energy overhead of ASM.

|  | Average Power Consumption (mW) | Overhead (%) |
|---|---|---|
| AOSP | 670.42 | — |
| ASM w/o ASM app | 692.83 | 3.34 |
| ASM w/ ASM app | 732.98 | 9.33 |

We monitor system energy consumption while running the test applications from Section 6.2. When the hooks are deactivated, we measured an energy consumption overhead of about 3.34%. Our ASM app used for the performance and energy consumption experiments measured an overhead of about 9.33%. This overhead is caused by the active authorization hooks in the relevant OS components and kernel, as well as the communication between the authorization hooks, the ASM Bridge, and the ASM app.

It should be noted that performing accurate energy consumption measurements on smartphones is a challenge. While we consider the individual measurements to be accurate, we acknowledge that the low sampling rate used by the Trepn profiler is problematic. However, each individual experiment is performed 50 times, therefore we believe Trepn's measurements to at least provide a rough estimate of the energy consumption overhead introduced by ASM.

7 Related Work

Section 4 discussed Android security enhancements that modify the Android firmware to achieve security mediation. As an alternative approach, Aurasium [35], AppGuard [5], RetroSkeleton [11] and Dr. Android and Mr. Hide [20] repackage applications with inline reference monitors (IRMs). While IRMs do not require firmware modification, rewriting frequently breaks applications, and the resulting mediation may be circumvented if API coverage is incomplete or native libraries are used. Placing access control mediation within the OS provides stronger guarantees.

ASM follows the methodology of the LSM [34] and TrustedBSD [32] reference monitor interface frameworks. Both frameworks have been highly successful. In Linux, LSM is widely used to extend Linux security enforcement. Version 3.13 of Linux kernel source includes SELinux [28], AppArmor [3], Tomoyo [31], Smack [30], and Yama [36] LSMs. TrustedBSD is not only used by FreeBSD, but also by Apple to implement seatbelt in Mac OS X and iOS [33].

FlaskDroid [9] also shares motivation with ASM. It provides an SELinux-style Type Enforcement (TE) policy language for extending Android security. FlaskDroid also allows third-party application developers to specify TE policies to protect their applications. However, FlaskDroid is limited to TE access control policies. By providing a programmable interface, ASM enables an extensible interface that allows not only TE, but also novel security models not yet invented. Specifically, we believe the ability to replace data values will become vital in protecting new operating systems such as Android.

Concurrent to and independent of our work on ASM, the Android Security Framework (ASF) [4] also provides an extensible interface to implement security modules. ASM and ASF are conceptually very similar: both promote the need for a programmable interface, authorization hooks that replace data (called edit automata in ASF), and third-party hooks (via callModule( ) in ASF). However, their individual approaches differ. A key difference is that ASM seeks to ensure existing security guarantees (Goal G2), whereas ASF assumes the module writer is completely trusted (e.g., can load kernel modules). Goal G2 is motivated by our vision of enterprise IT and researchers loading ASM apps on production phones without root access. ASF does not support this vision. Furthermore, a vulnerable ASF module can undermine secrecy and integrity of the system and all installed applications. That said, ASF does provide expressibility that ASM does not. Specifically, ASF provides a programmable interface to adding inline reference monitors to apps. While IRMs run the risk of breaking apps, they do support sub-application policies that ASM cannot express (e.g., forcing an app to use https over http).

Finally, Section 5.4 identified the AppOps security enhancement that is currently under development in AOSP. AppOps adds authorization hooks throughout the Android OS. However, AppOps does not provide a programmable interface for enhancing OS security. Instead, we envision separating the authorization hooks from AppOps and implementing AppOps as an ASM app. A similar process occurred during the creation of LSM when it was split away from SELinux.

Figure 3:
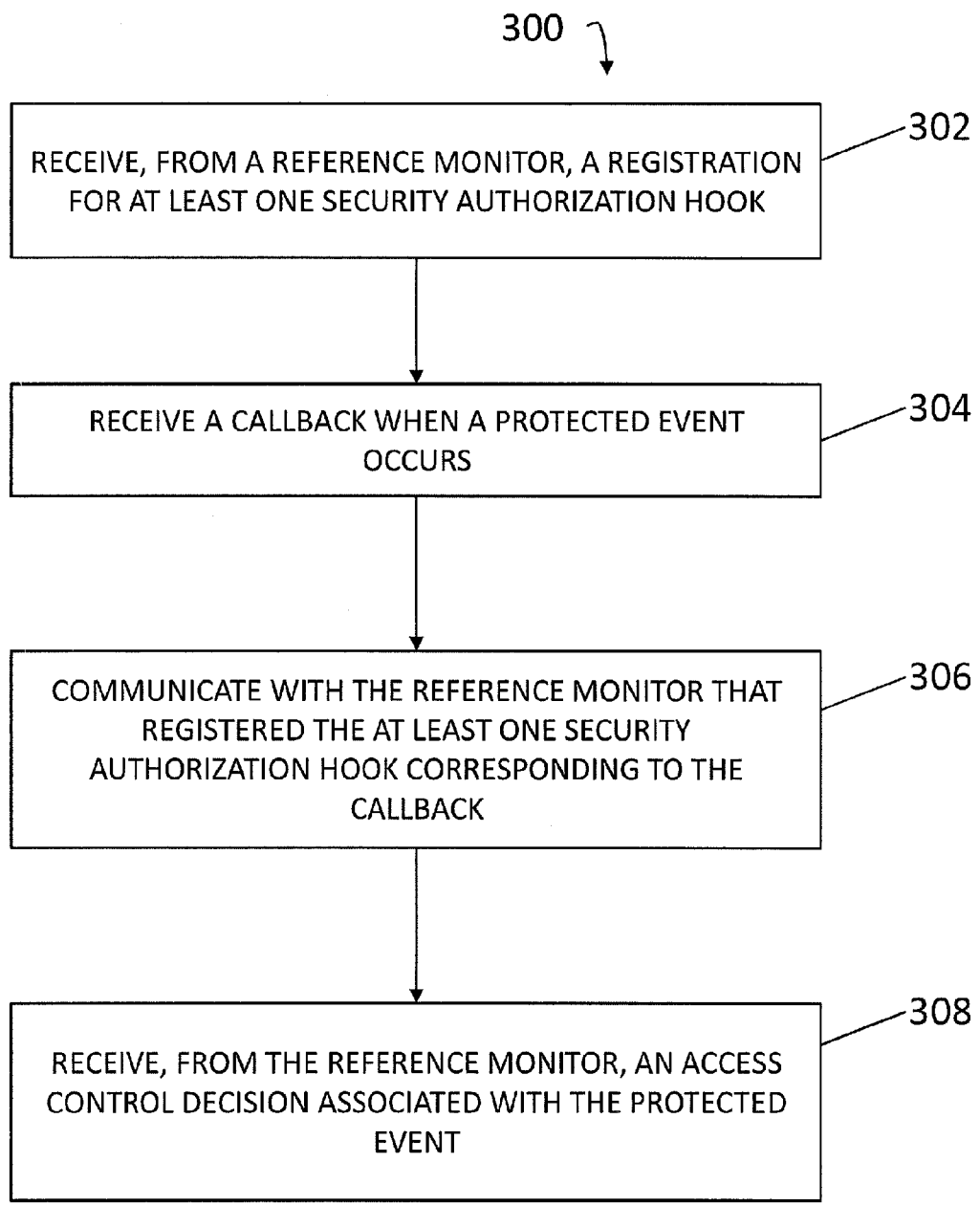
FIG. 3 is a flow chart illustrating an exemplary process for human-machine interaction using an electromyography-based trackpad according to an embodiment of the subject matter described herein.

FIG. 3 is a diagram illustrating a process 300 for human-machine interaction using an electromyography-based trackpad according to an embodiment of the subject matter described herein. In some embodiments, process 300, or portions thereof, may be performed by or at a computing platform, a smartphone, a user device, a tablet computer, a mobile device, an application-based operating system security module bridge, a reference monitor, an ASM bridge, an ASM app, and/or another node or module. In some embodiments, process 300 may include steps 302, 304, 306, and/or 308.

At step 302, a registration for at least one security authorization hook may be received from a reference monitor. For example, an ASM app may register for a unique set of security authorization hooks and may specify a callback for each of the security authorization hooks.

At step 304, a callback may be received when a protected event occurs. For example, a security hook in the Linux kernel or Android OS may provide access control bundle and/or a callback to an ASM bridge.

At step 306, the reference monitor that registered the at least one security authorization hook corresponding to the callback may be communicated with and/or notified. For example, after receiving an access control bundle associated with a callback, an ASM bridge may send the access control bundle to a corresponding ASM app.

At step 308, an access control decision associated with the protected event may be received from the reference monitor. For example, an access control decision may be sent from an ASM app and may include an indication of whether the protected event should be allowed or denied or an indication that information related to the protected event should be modified.

It will be appreciated that FIG. 3 is for illustrative purposes and that different and/or additional steps than those depicted in FIG. 3 may be usable for extending security of an application-based computer operating system.

8 Conclusion

The subject matter described herein has presented various aspects and/or embodiments associated with an Android Security Modules (ASM) framework as a programmable interface for extending Android's security. While similar reference monitor interfaces have been proposed for Linux and TrustedBSD, ASM is novel in how it addresses the semantically rich OS APIs provided by new operating systems such as Android. We studied over a dozen research proposals that enhance Android security to motivate the reference monitor interface hooks provided by ASM.

The subject matter described herein includes various improvements over other security architectures in this space. Particularly, ASM can provide the unique ability to recognize and manage OS level hooks, the OS being Android (or any other modern OS), and not the kernel. Further, ASM can provide ASM apps or reference monitors the ability to modify or replace data associated with a protected event. Also, ASM can provide a platform for allowing third-party application developers to define new hooks.

ASM promotes the creation of novel security enhancements to Android without restricting OS consumers (e.g., consumers, enterprise, and government) to specific policy languages (e.g., type enforcement). ASM allows researchers with the ability to recompile Android to rapidly prototype novel reference monitors without needing to consider authorization hook placement. If ASM is adopted into the AOSP source code, it potentially can allow researchers and enterprise IT to add new reference monitors to production Android devices without requiring root access, which is a significant limitation of existing bring-your-own-device solutions.

REFERENCES

The disclosure of each of the following references is incorporated herein by reference in its entirety.

[1] android-apktool. https://code.google.com/p/android-apktool/.
[2] Anderson, J. P. Computer Security Technology Planning Study. ESDTR-73-51, Air Force Electronic Systems Division, Hanscom AFB, Bedford, Mass., 1972. (Also available as Vol. I, DITCAD-758206. Vol. II DITCAD-772806).
[3] AppArmor. http://apparmor.net. Accessed January 2014.
[4] Backes, M., Bugiel, S., Gerling, S., and von Styp-Rekowsky, P. Android Security Framework: Enabling Generic and Extensible Access Control on Android. Tech. Rep. A/01/2014, Saarland University, April 2014.
[5] Backes, M., Gerling, S., Hammer, C., Maffei, M., and Styp-Rekowsky, P. AppGuard—Enforcing User Requirements on Android Apps. In Proceedings of TACAS. Springer Berlin Heidelberg, 2013.
[6] Beresford, A. R., Rice, A., Skehin, N., and Sohan, R. MockDroid: Trading Privacy for Application Functionality on Smartphones. In Proceedings of HotMobile (2011).
[7] Bugiel, S., Davi, L., Dmitrienko, A., Fischer, T., and Sadeghi, A.-R. XManDroid: A New Android Evolution to Mitigate Privilege Escalation Attacks. Tech. Rep. TR-2011-04, Technische Universitat Darmstadt, Center for Advanced Security Research Darmstadt, Darmstadt, Germany, April 2011.
[8] Bugiel, S., Davi, L., Dmitrienko, A., Heuser, S., Sadeghi, A.-R., and Shastry, B. Practical and Lightweight Domain Isolation on Android. In Proceedings of the ACM Workshop on Security and Privacy in Mobile Devices (SPSM) (2011).
[9] Bugiel, S., Heuser, S., and Sadeghi, A.-R. Flexible and Fine-Grained Mandatory Access Control on Android for Diverse Security and Privacy Policies. In Proceedings of the USENIX Security Symposium (2013).
[10] Conti, M., Nguyen, V. T. N., and Crispo, B. CRePE: Context-Related Policy Enforcement for Android. In Proceedings of ISC (2010).
[11] Davis, B., and Chen, H. RetroSkeleton: Retrofitting Android Apps. In Proceedings of MobiSys (2013).
[12] Dietz, M., Shekhar, S., Pisetsky, Y., Shu, A., and Wallach, D. S. Quire: Lightweight Provenance for Smart Phone Operating Systems. In Proceedings of the USENIX Security Symposium (2011).
[13] DoMobile Lab. AppLock. https://play.google.com/store/apps/details?id=com.domobile.applock.
[14] Enck, W., Gilbert, P., Chun, B.-G., Cox, L. P., Jung, J., McDaniel, P., and Sheth, A. N. TaintDroid: An Information-Flow Tracking System for Realtime Privacy Monitoring on Smartphones. In Proceedings of USENIX OSDI (2010).
[15] Enck, W., Ongtang, M., and McDaniel, P. On Lightweight Mobile Phone Application Certification. In Proceedings of ACM CCS (2009).
[16] Felt, A. P., Egelman, S., Finifter, M., Akhawe, D., and Wagner, D. How to Ask For Permission. In Proceedings of the USENIX Workshop on Hot Topics in Security (HotSec) (2012).
[17] Felt, A. P., Ha, E., Egelman, S., Haney, A., Chin, E., and Wagner, D. Android permissions: user attention, comprehension, and behavior. In Proceedings of SOUPS (2012).

[18] Felt, A. P., Wang, H. J., Moshchuk, A., Hanna, S., and Chin, E. Permission Re-Delegation: Attacks and Defenses. In Proceedings of the USENIX Security Symposium (August 2011).

[19] Hornyack, P., Han, S., Jung, J., Schechter, S., and Wetherall, D. These Aren't the Droids You're Looking For: Retrofitting Android to Protect Data from Imperious Applications. In Proceedings of ACM CCS (2011).

[20] Jeon, J., Micinski, K. K., Vaughan, J. A., Fogel, A., Reddy, N., Foster, J. S., and Millstein, T. Dr. Android and Mr. Hide: Fine-grained Permissions in Android Applications. In Proceedings of the ACM Workshop on Security and Privacy in Mobile Devices (SPSM) (2012), ACM.

[21] McDaniel, P., and Prakash, A. Methods and limitations of security policy reconciliation. In Proceedings of IEEE S&P (2002), IEEE Computer Society.

[22] Nadkarni, A., and Enck, W. Preventing Accidental Data Disclosure in Modern Operating Systems. In Proceedings of ACM CCS (2013).

[23] Nauman, M., Khan, S., and Zhang, X. Apex: Extending Android Permission Model and Enforcement with User-defined Runtime Constraints. In Proceedings of ASI-ACCS (2010).

[24] Ongtang, M., McLaughlin, S., Enck, W., and McDaniel, P. Semantically Rich Application-Centric Security in Android. In Proceedings of the Annual Computer Security Applications Conference (2009).

[25] Qualcomm. Trepn Profiler. https://developer.qualcomm.com/mobile-development/increase-app-performance/trepn-profiler.

[26] Rao, V., and Jaeger, T. Dynamic Mandatory Access Control for Multiple Stakeholders. In Proceedings of ACM SACMAT (2009), ACM.

[27] Schaufler, C. [PATCH v13 0/9] LSM: Multiple concurrent LSMs. https://lkml.org/lkml/2013/4/23/307, 2013.

[28] Security-Enhanced Linux. http://selinuxproject.org. Accessed January 2014.

[29] Smalley, S., and Craig, R. Security Enhanced (SE) Android: Bringing Flexible MAC to Android. In Proceedings of NDSS (2013).

[30] The Smack Project. http://schaufler-ca.com/. Accessed February 2014.

[31] TOMOYO Linux. http://tomoyo.sourceforge.jp. Accessed February 2014.

[32] Watson, R. N. M. TrustedBSD: Adding Trusted Operating System Features to FreeBSD. In Proceedings of the USENIX Annual Technical Conference, FREENIX Track (2001).

[33] Watson, R. N. M. A Decade of OS Access-Control Extensibility. Communications of the ACM 56, 2 (February 2013).

[34] Write, C., Cowan, C., Smalley, S., Morris, J., and Kroah-Hartman, G. Linux Security Modules: General Security Support for the Linux Kernel. In Proceedings of the USENIX Security Symposium (2002).

[35] Xu, R., Saidi, H., and Anderson, R. Aurasium: Practical Policy Enforcement for Android Applications. In Proceedings of the USENIX Security Symposium (2012).

[36] Yama Ism. https://www.kernel.org/doc/Documentation/security/Yama.txt. Accessed February 2014.

[37] Zhou, Y., Zhang, X., Jiang, X., and Freeh, V. W. Taming Information-Stealing Smartphone Applications (on Android). In Proceedings of the International Conference on Trust and Trustworthy Computing (June 2011).

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for extending security of an application-based computer operating system, the system comprising:
a memory; and
an application-based operating system security module bridge implemented in the application-based computer operating system and embodied in the memory, wherein the application-based operating system security module bridge is for receiving, from a reference monitor implemented as an application residing outside of the application-based computer operating system, a registration for at least one security authorization hook, for receiving a callback when a protected event occurs, for communicating with the reference monitor that registered the at least one security authorization hook corresponding to the callback, and for receiving, from the reference monitor, an access control decision associated with the protected event.

2. The system of claim 1 wherein prior to registering the at least one security authorization hook, the reference monitor performs a protected registration with the application-based operating system security module bridge.

3. The system of claim 1 wherein the protected event includes an operating system event requiring access control.

4. The system of claim 1 wherein the at least one security authorization hook is implemented in a kernel or in the application-based computer operating system.

5. The system of claim 1 wherein the at least one security authorization hook includes an application lifecycle hook, an operating system service hook, an operating system content provider hook, or a kernel-based hook.

6. The system of claim 1 wherein the application-based operating system security module bridge is implemented in a mobile operating system, an Android operating system, an iOS operating system, a Windows operating system, or a Linux variant operating system.

7. The system of claim 1 wherein the reference monitor specifies a callback for each of the at least one security authorization hook.

8. The system of claim 1 wherein the application-based operating system security module bridge utilizes a policy that defines policy conflict reconciliation in situations where multiple reference monitors provide different access control decisions associated with the protected event.

9. The system of claim 1 wherein the access control decision includes an indication of whether the protected event should be allowed or denied, an indication that information related to the protected event should be modified, or modified information related to the protected event.

10. The system of claim 9 wherein the application-based operating system security module bridge provides an access control bundle associated with the at least one security authorization hook when the protection event occurs, wherein the access control bundle includes information for potential modification and for determining whether the protected event is allowed or denied.

11. A method for extending security of an application-based computer operating system, the method comprising:
at an application-based operating system security module bridge implemented in the application-based computer operating system and embodied in a memory:
receiving, from a reference monitor implemented as an application residing outside of the application-based computer operating system, a registration for at least one security authorization hook;

receiving a callback when a protected event occurs;
communicating with the reference monitor that registered the at least one security authorization hook corresponding to the callback; and
receiving, from the reference monitor, an access control decision associated with the protected event.

12. The method of claim 11 wherein prior to registering the at least one security authorization hook, performing a protected registration for registering the reference monitor with the application-based operating system security module bridge.

13. The method of claim 11 wherein the protected event includes an operating system event requiring access control.

14. The method of claim 11 wherein the at least one security authorization hook is implemented in a kernel or in the application-based computer operating system.

15. The method of claim 11 wherein the at least one security authorization hook includes an application lifecycle hook, an operating system service hook, an operating system content provider hook, or a kernel-based hook.

16. The method of claim 11 wherein the application-based operating system security module bridge is implemented in a mobile operating system, an Android operating system, an iOS operating system, a Windows operating system, or a Linux variant operating system.

17. The method of claim 11 wherein receiving the registration for the at least one security authorization hook includes receiving a callback for each of the at least one security authorization hook.

18. The method of claim 11 comprising:
at the application-based operating system security module bridge:
utilizing a policy that defines policy conflict reconciliation in situations where multiple reference monitors provide different access control decisions associated with the protected event.

19. The method of claim 11 wherein the access control decision includes an indication of whether the protected event should be allowed or denied, an indication that information related to the protected event should be modified, or modified information related to the protected event.

20. The method of claim 19 wherein communicating with the reference monitor includes providing an access control bundle associated with the at least one security authorization hook when the protection event occurs, wherein the access control bundle includes information for potential modification and for determining whether the protected event is allowed or denied.

21. A non-transitory computer readable medium having stored thereon executable instructions that when executed by a processor of a computer causes a computer to perform steps comprising:
at an application-based operating system security module bridge implemented within an application-based computer operating system and embodied in a memory:
receiving, from a reference monitor implemented as an application residing outside of the application-based computer operating system, a registration for at least one security authorization hook;
receiving a callback when a protected event occurs;
communicating with the reference monitor that registered the at least one security authorization hook corresponding to the callback; and
receiving, from the reference monitor, an access control decision associated with the protected event.

* * * * *